Sept. 6, 1960     S. K. STAUTH ET AL     2,951,579
CONVEYER TROUGH JOINT
Filed March 12, 1958
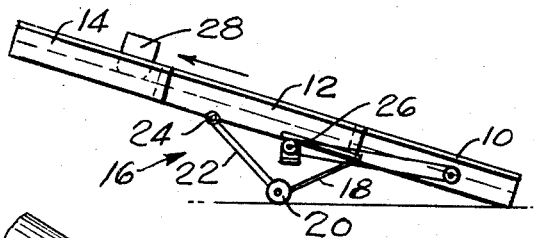
Fig. 1
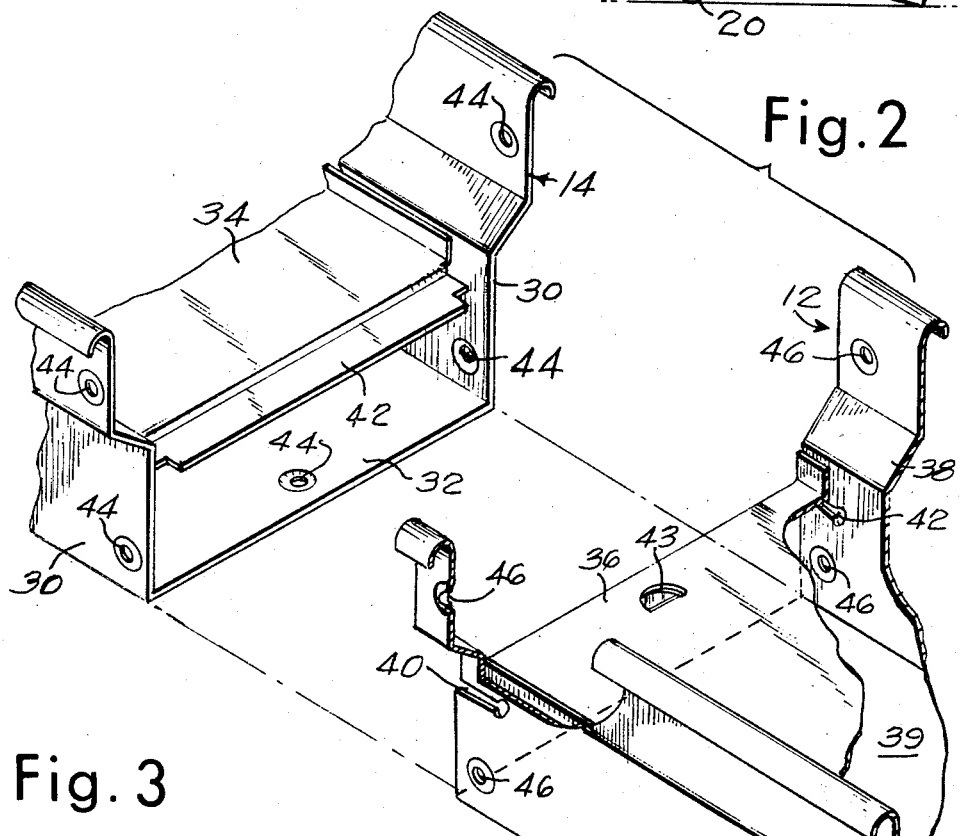
Fig. 2
Fig. 3
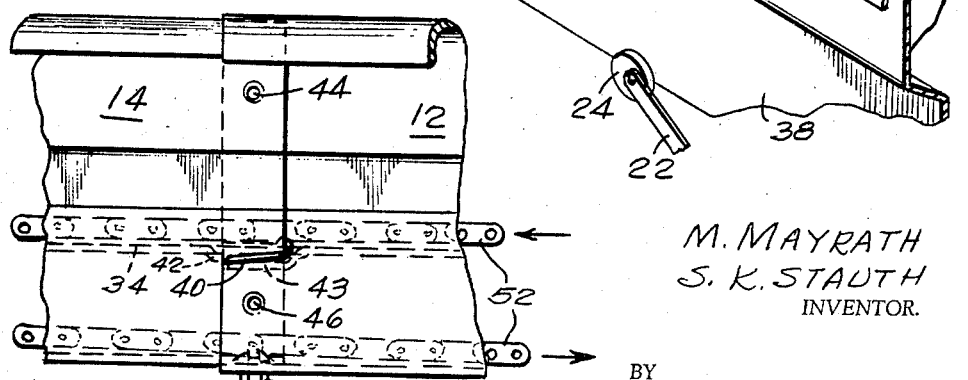
M. MAYRATH
S. K. STAUTH
INVENTOR.
BY
Homer R. Montague
ATTY United States Patent Office 2,951,579
Patented Sept. 6, 1960

2,951,579
CONVEYER TROUGH JOINT

Sam K. Stauth, Compton, Ill., and Martin Mayrath, Dallas, Tex., assignors to Mayrath Company, a corporation of Illinois Filed Mar. 12, 1958, Ser. No. 720,996

4 Claims. (Cl. 198—204)

This invention pertains generally to conveyer mechanisms, and more particularly to conveyer mechanisms which include a plurality of end-connected trough members.

Of the many types of conveyers and elevators which are in use today, one type which has found wide application generally includes an open-top trough member along which a plurality of pusher bars or flights are caused to move by means of endless sprocket chains or the like. Where the operation is one of elevation, the flights are carried up the inclined trough along the inner surface of the bottom of the trough, and are returned in the other direction along the under side of the trough. The material to be elevated is placed in the trough near the lower end thereof and is carried up to a discharge point (usually the upper end of the trough) by the flights or pusher bars. Since the flights are usually shaped to fit the inner surfaces of the bottom of the trough, loose finely divided material such as grain or the like may be elevated equally as well as larger bundle or bales. One of the more widely known uses for elevators of this general type is, in fact, the alternate elevation of either loose relatively small particles or larger bales of the products of agricultural enterprise.

As a practical matter, the under side of the trough referred to above is usually a second trough which is closed at the top by the bottom wall of the first trough. This second trough serves as a closed return path for the flight and chain assembly in order to provide safety for the personnel working around the machine as well as to prevent damage to the apparatus itself as might occur if the uncovered chain and flights were to come in contact with foreign objects.

Further, it has been found impractical in many instances to either store or transport elevators or conveyers of this type where the length of the trough member is sufficiently great to accomplish elevation of materials from ground level to, say the upper portions of a barn or the like. In order to be able to perform such work and still have an apparatus which may conveniently be stored or transported, it has become customary to construct the trough member in several sections which may be connected together to form an elevator of sufficient length for the desired job.

Where such plural-section troughs are employed, there arises the problem of connecting the several sections together in the most practical manner. One solution to this problem has been to hold the two adjacent section ends in abutting relation and apply suitable clamps or the like along with, in most cases, some sort of reinforcing means. In another trough joint, the trough members were so constructed that the end of one could be fitted within the mating end of another, that is, the two would be partially telescoped, and then suitable clamps and reinforcing means would be added as before.

While each of the aforementioned joints achieves the prime requirement of holding together the adjacent trough members, there are certain disadvantages in the use of each. For example, in either case the added weight at the joint causes the weight and strength of successive transverse cross-sections to vary between joint portions and middle portions of the several trough members. This is a distinct disadvantage where, as is the case in some elevators, the support structure below the elevator trough is movable relative to the trough member along its underside in order to provide an easy adjustment for the angle of elevation. Since the point of support is thus often not an optimum point from the standpoint of mechanical strength and rigidity, deformation of the trough member and faulty operation of the elevator often result. This is particularly true under conditions of heavy load or while the elevator is being transported over rough terrain, or both. Also, the clamping reinforcing means which have been found necessary add to the cost of manufacture of the conveyer.

Another disadvantage of the aforementioned telescoping joint is the fact that the returning flights and chain will hammer against the exposed upper end of the walls of the bottom troughs of all but the uppermost trough member, since a given trough member will be telescoped within the next adjacent trough member in the direction of travel of the chain and flights to provide relatively smooth action in the upper troughs and to avoid such hammering on the load reach of the chain. Of course, at each end of the conveyer the chains are supported by sprockets or other suitable rotary members. While attachments of sheet metal or the like may be utilized to preclude the aforementioned hammering, such attachments also increase the cost of the conveyer and further disturb the mechanical rigidity.

It is a primary object of the present invention to provide a trough joint for conveyers and the like in which the necessary mechanical strength is achieved with a minimum of parts and at a cost which is low relative to the devices of the prior art.

Another object of the invention is to provide a telescoping-type trough joint for chain-and-flight conveyers in which relatively smooth travel of the chain and flights is achieved in both the load direction and the return direction.

An additional object of the invention is to provide a trough member for conveyers and the like which when connected to another similar trough member provides a trough joint in which the necessary mechanical strength is achieved with a minimum of parts and at a cost which is low relative to the devices of the prior art.

Still another object of the invention is to provide a trough member for chain-and-flight conveyers which when connected to another similar trough member provides a trough joint in which relatively smooth travel of the chain and flights is achieved in both the load direction and the return direction.

In accordance with the present invention, the above and other objects are achieved by means of trough members having upper and lower troughs serving respectively as the load-carrying trough and the chain-return trough, the trough members being constructed for partial telescoping engagement with each other such that where the upper trough of one trough member fits within the upper trough of another trough member, the lower trough of the second member fits within the lower trough of the first.

More particularly, where the conveyor is utilized for elevation of materials in one form or another, and where a plurality of such trough members are connected end-to-end to form the elongate conveyer, the upper trough of the first or lower-most trough member fits within the upper trough of the second trough member. Similarly, the upper troughs of each of the succeeding trough members in the direction of load elevation fit within the upper trough of the following trough member until the uppermost trough member is reached. By virtue of the construction as thus far described, the flights of the conveyer are pulled along the inner surfaces of the upper troughs in each of the trough members, and as the end of each upper trough is reached by a given flight member it merely drops over the end of that trough and starts its travel along the next trough. Had the direction of telescoping engagement been reversed, the flight and chains would have met the exposed lower end of the upper trough of the following trough member, resulting in noisy operation and occasionally even causing a breakdown of the apparatus.

At the ends of the conveyer trough assembly the flight chains pass over sprockets or the like and reverse their direction of travel. Once a given flight member has completed its travel along the upper troughs of the several connected trough members, it is returned to its starting point through the lower troughs. Since the direction of travel is the reverse of the load-pulling direction, it is desirable that the direction or sense of telescoping engagement also be reversed in order to avoid the hammering and other mechanical difficulties described in connection with the forward travel of the flights in the upper troughs. In the apparatus of the present invention such reverse engagement is achieved. In particular, the lower trough of the upper-most trough member fits within the lower trough of the next trough member in the direction of flight return. Similarly, the lower troughs of each of the succeeding trough members fit within the lower troughs of the following trough members, in the return direction, until the lower-most trough member is reached.

In order to provide for this reverse engagement, that is, in order to provide a joint in which the upper troughs partially telescope in one direction while the lower troughs partially telescope in the other direction, slots or similar openings are provided in the side walls of the trough members at the ends thereof. These slots are substantially parallel to the bottom walls of the troughs, and at least one slot appears at each side of each trough member joint. That is to say, at each side of each trough member joint one of the mating pair of side walls must have such a slot in order to receive an end portion of the other side wall within such slot. Whether the two slots at each trough member joint reside in the same or different trough members, is a matter of choice in the design of the trough members, so long as at least one slot is present at each of the two sides of each joint. By means of such slots the ends of the trough members may be partially telescoped despite the fact that the upper troughs are telescoping in one direction and the lower troughs are telescoping in the other direction.

In order to secure together two such partially telescoped trough members, threaded fasteners such as bolts are passed through apertures in the overlapping portions of the side and bottom walls of the trough members, the respective mating pairs of apertures being in registry when the two trough members are properly positioned to form the joint. To prevent the chains or flights from striking these fasteners, it is desirable to dimple outwardly or otherwise depress the areas immediately adjacent the fastener apertures. Thus, if flat-headed bolts are employed, the flat heads thereof may form an almost flush surface with the inner portions of the troughs.

With the above considerations and objects in mind, the invention itself will now be described in connection with a preferred embodiment thereof given by way of example and not of limitation, and with reference to the accompanying drawings, in which:

Fig. 1 is a side elevation of a conveyer of the general type to which the present invention pertains, showing in connection therewith a transporting support assembly.

Fig. 2 is a perspective exploded view of mating end portions (with parts broken away for clarity) of a pair of conveyer trough members constructed in a manner providing a trough joint in accordance with the present invention.

Fig. 3 is a side elevation of the trough member joint of the present invention, showing the two trough member end portions of Fig. 2 in engagement.

In Fig. 1 there is shown one type of conveyer to which the present invention is applicable. As shown, the conveyer is arranged for the operation of elevation and comprises three trough members 10, 12 and 14, which trough members are connected together by means of the trough joint of this invention as will be described. The conveyer as a whole is supported for transportation or for stationary working by the support assembly indicated generally at 16, and which includes a pair of legs 18 which are attached to trough member 10 and to the axle (not shown) of a pair of wheels 20. Also attached to this axle is a second pair of legs 22, the upper ends of which are each terminated by a rotary flanged wheel 24 which rides along the under side of the trough members at one edge thereof and which serves as the variable position support means for adjusting the degree of elevation of the conveyer. A chain or rope and winch arrangement, not shown, is usually provided to hold legs 22 at the desired angle. An engine 26, which may be gasoline driven or any other suitable type, is secured to the conveyer and provides the necessary motion for the chain and flight assembly within the trough members as is understood by those skilled in the art. The chains and flights are not shown in Fig. 1, but the centrally located shelf upon which slide the materials to be elevated, such as bale 28, is indicated in dotted lines.

The adjacent or mating end portions of trough members 12 and 14 are shown separated and in perspective view in Fig. 2. Trough member 14 includes side walls 30, bottom wall 32 and the substantially centrally located shelf 34, the latter dividing the trough member into an upper trough which is defined by side walls 30 and shelf 34, and a lower trough defined by side walls 30 and bottom wall 32. A similar arrangement obtains with respect to trough member 12, where a similar shelf 36 divides the trough member into upper and lower troughs. In accordance with one preferred embodiment of the invention, the side walls 38 of trough member 12 include slots 40 and 42, respectively, each of the slots forming a re-entrant opening in the end edge of the wall. The particular shape of these side walls is a matter of choice in design and does not form a part of the present invention.

The shelves 34 and 36 are secured to their respective side walls in any suitable manner, such as by welding or the like, and the visible end of shelf 34 has a bent-down portion 42 which allows shelf 36 to lie in approximate alignment with shelf 34 when the two trough members are brought together to form the joint. A struck-out portion 43 in shelf 36 is adapted to receive the leading edge of bent-down portion 42 of shelf 34.

A plurality of apertures 44 are formed in the side and bottom walls of trough member 14, and a corresponding plurality of matching or mating apertures 46 are formed in trough member 12. The positioning of these matching pairs of apertures in the two trough members is such that when the two members 12 and 14 are brought together to form the joint as shown in Fig. 3, the paired apertures are in registry, and suitable fasteners may be passed therethrough and secured to hold the joint fixed. An exemplary fastener for this purpose is an ordinary binder-head or flat-head threaded bolt such as is shown at 48 in Fig. 3, along with the cooperating nut 50. As is indicated in Fig. 2, the area immediately adjacent each of the apertures in each of the trough members is dimpled or depressed away from the center of the trough. Upon forming the joint, these matching depressions aid in properly locating the two trough members and also serve to form a secure, tight joint between the two. Further, the depressions allow the bolt heads to be approximately flush with the wall surface.

Referring now to Fig. 3, the two trough members 12 and 14 are shown in joined position as in Fig. 1, but on an enlarged scale for better understanding of the exact nature of the inter-fitting of the two members. Except for the bolt 48 and its associated nut 50, none of the securing means are shown in this figure, also for the sake of clarity. As may be seen, the upper portion or trough of trough member 12 fits within and partially telescopes with the mating end of trough member 14; thus, the uppermost aperture visible in Fig. 3 is indicated by reference numeral 44, since it is one of the apertures in the side wall of trough member 14. The lower trough or portion of trough member 12 (i.e., the lower portion as defined by the side walls 38, bottom wall 39 and slots 40 and 42) receives within its walls the corersponding lower portion of trough member 14 in partial telescoping relation. Thus, the aperture 46 shows in Fig. 3 below slot 40. As stated in connection with Fig. 2, the bent-down portion 42 of shelf 34 is received (at least in part) by the struck-out portion 43 of shelf 36; this interfitting adds to the structural strength of the joint and holds the two shelves in approximate alignment.

As shown in Fig. 3, the two trough members are partially telescoped so that the upper portion of member 12 lies within that of member 14, while the lower portion of member 14 lies within that of member 12. The reversal in the direction of telescoping engagement takes place at the slot 40 (and at slot 42, not seen in Fig. 3), where the solid leading edge of trough member 14 changes from an exposed outer edge of the conveyer assembly to an inner edge. For the directions of telescoping shown, the endless flight chain 52 travels in the direction shown by the arrows. The telescoping engagement is accomplished easily, since one of each of the mating trough ends is slightly larger than its mate. This may be the result of either a gradual taper lengthwise of each of the troughs, or a deformation near the end only in what would otherwise be a non-tapering trough.

The operation of assembling the trough joint of the present invention is at once obvious. The two mating ends of the adjacent trough members are brought together and partially telescoped as just described. Suitable fasteners are inserted in the paired apertures, and the joint is secured. As the flight chain in the upper trough travels to the left as indicated in Fig. 3, it merely rides over the exposed end of shelf 36 and slides onto shelf 34. To the extent that the chains or flights bear against the side walls of member 12, the action is the same, viz., sliding past the end of the wall of member 12 and along the corresponding wall of member 14. On the return path for the chain and flights, the same operation obtains but in the reverse direction, since the chain and flights ride over the exposed end of bottom wall 32 and onto bottom wall 39.

The above invention has been described above in considerable detail, and particularly with reference to its application as an elevation for grain and the like. However, it will be apparent to those skilled in the art that the trough joint of the present invention is equally applicable to other types of conveyers. Also, the same structural type of conveyer as has been shown and described in this specification may equally well be used in the lowering of objects from a height to some lower position. In such case, the telescoping direction of both the upper and lower troughs would be the reverse of those shown and described herein, and the chain would travel in the reverse direction. Hence, the invention is not to be considered as limited to the particular details given, nor to the specific application to which reference has been made during the description of the apparatus, except insofar as may be required by the scope of the appended claims.

What is claimed is:

1. In a chain-and-flight conveyer of the type having a plurality of end-connected elongate trough members, a trough member comprising a pair of opposed side walls, bottom wall connected between said side walls, and a shelf extending substantially centrally across said trough members, said shelf serving to divide said trough member into upper and lower troughs, the inner dimensions of said upper trough at one end of said trough member being slightly larger than the outer dimensions of the upper trough at the other end of said trough member, the outer dimensions of the lower trough at said one end of said trough member being slightly smaller than the inner dimensions of the lower trough at said other end of said trough member, a re-entrant slot substantially centrally located in each of said lower trough side walls intersecting one end thereof, and means for securing said trough member ends to respective mating ends of other similar trough members, whereby the upper end of one trough member receives within its walls the upper end of the adjacent trough member, and the lower end of the first trough member is received within the walls of said adjacent trough member.

2. In a conveyer of the type having a plurality of end connected trough elements, a trough element comprising a pair of opposed side walls, a bottom wall connecting said side walls, and a dividing shelf extending substantially centrally across said trough element to divide the same into upper and lower troughs, the inner dimensions of said upper trough at one end of said trough element being slightly larger than the outer dimensions of the upper trough at the other end of said trough element, the outer dimensions of the lower trough at said one end of said trough element being slightly smaller than the inner dimensions of the lower trough at the other end of said trough element, a re-entrant slot located in each of said side walls on the lower trough at the end of the trough element having the larger dimensions at the lower trough level, and means for securing said trough element ends to respective mating ends of adjacent trough elements, whereby the upper end of one trough element receives within its walls the upper end of the adjacent trough element, and the lower end of the first trough element is received within the walls of said adjacent trough element.

3. A trough element joint as set forth in claim 2, wherein the upper edges of the side walls are bent over at each end of the trough element to form lips that telescope with the corresponding lips on the end of the adjacent trough element to aid in locking them together.

4. A trough element joint as set forth in claim 2, in which the shelf of one of said end portions is positioned to lie upon the shelf of the other of said end portions, said first mentioned shelf having a struck-out tongue portion for receiving a terminal edge of said second mentioned shelf.

References Cited in the file of this patent

UNITED STATES PATENTS

| 1,854,561 | Owens et al. | Apr. 19, 1932 |
| 2,718,296 | Johnson | Sept. 20, 1955 |

FOREIGN PATENTS

| 498,316 | Belgium | Oct. 14, 1950 |
| 698,169 | Great Britain | Oct. 7, 1953 |
| 1,134,939 | France | Dec. 10, 1956 |